(12) United States Patent
Somerville et al.

(10) Patent No.: US 12,497,553 B2
(45) Date of Patent: Dec. 16, 2025

(54) LIGNIN-BASED COMPOSITIONS AND RELATED CLEANING METHODS

(71) Applicant: LignoSol IP Limited, San Gwann (MT)

(72) Inventors: Desmond Alexander Somerville, San Gwann (MT); Patrick Dieter Waibel, San Gwann (MT)

(73) Assignee: LignoSol IP Limited, San Gwann (MT)

( * ) Notice: Subject to any disclaimer, the term of this patent is extended or adjusted under 35 U.S.C. 154(b) by 180 days.

(21) Appl. No.: 18/285,911

(22) PCT Filed: Apr. 5, 2022

(86) PCT No.: PCT/IB2022/053148
§ 371 (c)(1),
(2) Date: Oct. 6, 2023

(87) PCT Pub. No.: WO2022/214952
PCT Pub. Date: Oct. 13, 2022

(65) Prior Publication Data
US 2024/0384157 A1 Nov. 21, 2024

(30) Foreign Application Priority Data

Apr. 6, 2021 (GB) .................................... 2104862
Nov. 8, 2021 (GB) .................................... 2115987

(51) Int. Cl.
*C09K 8/524* (2006.01)
*C12N 1/20* (2006.01)
*C12R 1/07* (2006.01)

(52) U.S. Cl.
CPC .............. *C09K 8/524* (2013.01); *C12N 1/205* (2021.05); *C09K 2208/10* (2013.01); *C12R 2001/07* (2021.05)

(58) Field of Classification Search
None
See application file for complete search history.

(56) References Cited

U.S. PATENT DOCUMENTS

| | | | |
|---|---|---|---|
| 3,438,895 A | 4/1969 | Edmonsond et al. |
| 4,101,394 A | 7/1978 | Johnson |

(Continued)

FOREIGN PATENT DOCUMENTS

| | | | |
|---|---|---|---|
| CA | 1132452 A | 9/1982 |
| CA | 2425424 A1 | 4/2002 |

(Continued)

OTHER PUBLICATIONS

Beisl et al., "Lignin from Micro- to Nanosize: Production Methods." Int. Journal of Molecular Sciences. 18(6): 1244 (Jun. 10, 2017) (31 pages).

(Continued)

*Primary Examiner* — Jeffrey D Washville
(74) *Attorney, Agent, or Firm* — Clark & Elbing LLP

(57) ABSTRACT

Compositions are provided for hydrocarbon cleaning applications, in particular cleaning the surface(s) of vessels or platforms fouled by hydrocarbon containing materials. In some embodiments, the composition comprises lignin, in particular technical lignin, and at least one strain of bacteria capable of biosurfactant production and/or a biosurfactant produced by at least one such isolated strain of bacteria, and a catholyte solution. Also provided is a method of cleaning the surface(s) of vessels or platforms fouled by hydrocarbon containing materials.

20 Claims, 1 Drawing Sheet

(56) References Cited

U.S. PATENT DOCUMENTS

| | | | |
|---|---|---|---|
| 4,133,385 | A | 1/1979 | Kalfoglou |
| 4,304,572 | A | 12/1981 | Wiese et al. |
| 4,392,941 | A | 7/1983 | Roth et al. |
| 4,877,517 | A | 10/1989 | Bulatovic et al. |
| 5,028,238 | A | 7/1991 | von Rybinski et al. |
| 5,114,597 | A | 5/1992 | Rayborn et al. |
| 5,164,480 | A | 11/1992 | Huibers et al. |
| 5,246,602 | A | 9/1993 | Forrest |
| 5,248,329 | A | 9/1993 | Rusin et al. |
| 5,316,664 | A | 5/1994 | Gregoli et al. |
| 5,344,625 | A | 9/1994 | Clough |
| 5,368,972 | A | 11/1994 | Yamashita et al. |
| 5,911,276 | A | 6/1999 | Kieke |
| 6,306,800 | B1 | 10/2001 | Samuel et al. |
| 6,348,436 | B1 | 2/2002 | Langlois et al. |
| 8,450,260 | B2 | 5/2013 | Crawford et al. |
| 8,455,226 | B2 | 6/2013 | De Windt et al. |
| 8,748,153 | B2 | 6/2014 | Tadic et al. |
| 10,362,786 | B2 | 7/2019 | Chen et al. |
| 10,829,833 | B2 | 11/2020 | Gos et al. |
| 2002/0044887 | A1 | 4/2002 | Jones |
| 2009/0082227 | A1 | 3/2009 | Hnatow et al. |
| 2009/0266541 | A1 | 10/2009 | Reynolds et al. |
| 2010/0137168 | A1 | 6/2010 | Quintero et al. |
| 2010/0233050 | A1 | 9/2010 | Gargulak et al. |
| 2012/0247763 | A1 | 10/2012 | Rakitsky et al. |
| 2013/0274150 | A1 | 10/2013 | Holt et al. |
| 2014/0371071 | A1 | 12/2014 | Nitsche |
| 2015/0166836 | A1 | 6/2015 | Liu et al. |
| 2015/0285051 | A1 | 10/2015 | Miller et al. |
| 2016/0168272 | A1 | 6/2016 | Retsina et al. |
| 2017/0029691 | A1 | 2/2017 | Faust, Jr. et al. |
| 2018/0148632 | A1 | 5/2018 | Bennett et al. |
| 2018/0265794 | A1 | 9/2018 | Dahlstrand et al. |
| 2018/0355446 | A1 | 12/2018 | Medoff et al. |
| 2019/0031945 | A1 | 1/2019 | Guo et al. |
| 2019/0055459 | A1 | 2/2019 | Zelenev et al. |
| 2019/0093463 | A1 | 3/2019 | Hardin et al. |
| 2019/0382649 | A1 | 12/2019 | Jiang et al. |
| 2019/0390405 | A1 | 12/2019 | Geigle et al. |
| 2020/0032128 | A1 | 1/2020 | Farmer et al. |
| 2020/0157408 | A1 | 5/2020 | Farmer et al. |
| 2020/0172788 | A1 | 6/2020 | Farmer et al. |
| 2020/0255466 | A1 | 8/2020 | Lintinen et al. |

FOREIGN PATENT DOCUMENTS

| | | |
|---|---|---|
| CA | 2535702 A1 | 3/2005 |
| CA | 2547100 A1 | 11/2006 |
| CA | 2640005 A1 | 8/2007 |
| CA | 2661202 C | 11/2011 |
| CA | 2723591 C | 7/2013 |
| CA | 2705147 C | 9/2014 |
| CA | 2921996 A1 | 3/2015 |
| CA | 2693008 C | 4/2016 |
| CA | 2988826 A1 | 12/2016 |
| CA | 2791256 C | 6/2017 |
| CA | 3048404 A1 | 7/2018 |
| CA | 3052048 A1 | 8/2018 |
| CA | 3052465 A1 | 8/2018 |
| CA | 3054686 A1 | 9/2018 |
| CA | 3058761 A1 | 10/2018 |
| CA | 2999599 C | 12/2019 |
| CA | 2772395 C | 1/2020 |
| CA | 2720739 C | 4/2020 |
| CA | 2950089 C | 4/2020 |
| CA | 2831902 C | 5/2020 |
| CA | 2877367 C | 12/2020 |
| CA | 2945194 C | 7/2022 |
| CA | 2886934 C | 1/2023 |
| CN | 85105225 A | 7/1986 |
| CN | 101104177 A | 1/2008 |
| CN | 104152129 A | 11/2014 |
| CN | 106188857 A | 12/2016 |
| CN | 108441223 A | 8/2018 |
| CN | 106217826 B | 9/2018 |
| CN | 109943299 A | 6/2019 |
| CN | 110616062 A | 12/2019 |
| JP | 2017029892 A | 2/2017 |
| RU | 2188935 C1 | 9/2002 |
| WO | WO-2005/028592 A1 | 3/2005 |
| WO | WO-2012/151524 A2 | 11/2012 |
| WO | WO-2013/037643 A1 | 3/2013 |
| WO | WO-2015/065981 A1 | 5/2015 |
| WO | WO-2016/053345 A1 | 4/2016 |
| WO | WO-2016/196680 A1 | 12/2016 |
| WO | WO-2019/067356 A1 | 4/2019 |
| WO | WO-2019/112970 A1 | 6/2019 |
| WO | WO-2019/191296 A1 | 10/2019 |
| WO | WO-2019/213055 A1 | 11/2019 |
| WO | WO-2020/028253 A1 | 2/2020 |
| WO | WO-2020/060529 A1 | 3/2020 |
| WO | WO-2020/149756 A2 | 7/2020 |
| WO | WO-2020/264073 A1 | 12/2020 |
| WO | WO-2021/052939 A1 | 3/2021 |

OTHER PUBLICATIONS

Bicca et al., "Production of Biosurfactant by Hydrocarbon Degrading Rhodococcus Ruber and Rhodococcus Erythropolis." Revista de Microbiologia. 30: 231-236 (1999) (6 pages).

Chang et al., "A novel nano-lignin-based amphoteric copolymer as fluid-loss reducer in water-based drilling fluids." Colloids and Surfaces A. 583:123979 (Sep. 21, 2019) (10 pages).

Hruzová et al., "Organosolv lignin hydrophobic micro- and nanoparticles as a low-carbon footprint biodegradable flotation collector in mineral flotation." Bioresource Technology. 306:123235 (Mar. 23, 2020) (4 pages).

International Search Report and Written Opinion for International Application No. PCT/IB22/53145 mailed Jun. 27, 2022 (9 pages).

International Search Report and Written Opinion for International Application No. PCT/IB22/53147 mailed Jun. 15, 2022 (9 pages).

International Search Report and Written Opinion for International Application No. PCT/IB22/53148 mailed Jun. 27, 2022 (9 pages).

International Search Report and Written Opinion for International Application No. PCT/IB22/53151 mailed Jun. 29, 2022 (9 pages).

International Search Report and Written Opinion for International Application No. PCT/IB22/53158 mailed Jun. 21, 2022 (8 pages).

International Search Report and Written Opinion for International Application No. PCT/IB22/53160 mailed Jun. 29, 2022 (7 pages).

International Search Report and Written Opinion for International Application No. PCT/IB22/53161 mailed Jun. 27, 2022 (6 pages).

International Search Report and Written Opinion for International Application No. PCT/IB22/53162 mailed Jul. 1, 2022 (7 pages).

Li, Qingxin, "Rhamnolipid synthesis and production with diverse resources." Front. Chem. Sci. Eng. 11(1): 27-36 (Mar. 22, 2017) (10 pages).

Negi et al., "A review on lignin utilization in petroleum exploration, petroleum products formulation, bio-fuel production, and oil spill clean-up." Biomass Conversion and Biorefinery. 13: 1417-1428 (Nov. 5, 2020) (12 pages).

Sauki et al., "Extracted Lignin from Rhizophora's Black Liquor as Fluid Loss Control Additive in Water Based Drilling Mud." Key Engineering Materials. 755: 74-80 (Aug. 20, 2018) (8 pages).

Schneider et al., "Assessment of Morphological, Physical, Thermal, and Thermal Conductivity Properties of Polypropylene/ Lignosulfonate Blends." Materials. 14(3): 543 (Jan. 23, 2021) (10 pages).

Search and Examination Report for Application No. GB2104859.0, dated May 11, 2021 (8 pages).

Search and Examination Report for Application No. GB2104860.8, dated May 4, 2021 (8 pages).

Search and Examination Report for Application No. GB2104862.4, dated May 21, 2021 (8 pages).

Search and Examination Report for Application No. GB2104865.7, dated Jun. 8, 2021 (8 pages).

Search and Examination Report for Application No. GB2104869.9, dated Apr. 16, 2021 (6 pages).

(56) References Cited

OTHER PUBLICATIONS

Search and Examination Report for Application No. GB2104870.7, dated Jun. 2, 2021 (7 pages).
Search and Examination Report for Application No. GB2104877.2, dated May 10, 2021 (6 pages).
Search and Examination Report for Application No. GB2104883.0, dated May 4, 2021 (8 pages).
Search and Examination Report for Application No. GB2115987.6, dated Dec. 15, 2021 (6 pages).
Solihat et al., "Lignin as an Active Biomaterial: A Review." Jurnal Sylva Lestari. 9(1): 1-22 (Jan. 2021) (22 pages).

LIGNIN-BASED COMPOSITIONS AND RELATED CLEANING METHODS

CROSS-REFERENCE TO RELATED APPLICATIONS

This application claims priority to GB Provisional Patent Application No. 2104862.4, filed 6 Apr. 2021, and GB Provisional Patent Application No. 2115987.6, filed 8 Nov. 2021, the disclosures of which are hereby incorporated by reference in their entireties.

BACKGROUND OF THE INVENTION

The present disclosure relates to the cleaning of vessels such as storage tanks or tankers to remove or reduce fouling by hydrocarbon containing materials, such as oil, for example. More particularly, the present disclosure relates to lignin-based compositions for hydrocarbon cleaning applications and related methods.

Hydrocarbons, including natural gas and oil (petroleum), may be stored in storage tanks, for instance above ground storage tanks for natural gas or oil recovered from subterranean reservoirs, or transported in tankers from hydrocarbon recovery sites to refining facilities, for example. The nature of such hydrocarbon containing materials is such that the vessels used to contain or store them are subject to fouling and require cleaning. This cleaning also ensures recovery of all, or at least a significant portion, of the stored or transported hydrocarbon containing materials.

SUMMARY OF THE INVENTION

In one aspect, there is provided a method for cleaning a surface or surfaces fouled by a hydrocarbon containing material, the method comprising:
providing a composition comprising lignin, at least one isolated strain of bacteria capable of producing at least one biosurfactant, and/or at least one biosurfactant produced from at least one bacteria capable of producing a biosurfactant, and a catholyte solution;
contacting the surface(s) fouled by the hydrocarbon-containing material with the composition to remove or reduce the hydrocarbon fouling; and, optionally
recovering the hydrocarbon-containing material from the composition.

In some embodiments, the method comprises cleaning the surface(s) of a vessel, such as a storage tank, tanker, truck, bilge pump or the like, a pipe, such as an oil pipe, or a deck or platform, such as on a tanker deck or oil rig platform, for example.

In some embodiments, the surface(s) is/are contacted with the composition for a time sufficient to clean the surface(s), and the composition and hydrocarbon containing mixture recovered for further processing.

In some embodiments, the surfaces(s) to be cleaned are of a vessel or pipe, the method comprising flowing the composition through the vessel or pipe to clean the surface(s) thereof, and recovering the composition and hydrocarbon containing mixture from the vessel or pipe for further processing.

In some embodiments, the hydrocarbon-containing material comprises a hydrocarbon-containing liquid.

In another aspect, there is provided a hydrocarbon cleaning composition suitable for cleaning the surface(s) of vessels, such as storage tanks, tankers, trucks, bilge pumps or the like, pipes, such as oil pipes, or decks or platforms, such as on tankers or oil rigs, to remove or reduce fouling by hydrocarbon containing materials, the composition comprising lignin, in particular technical lignin, at least one isolated strain of bacteria capable of producing at least one biosurfactant, and/or at least one biosurfactant produced from at least one isolated strain of bacteria capable of producing a biosurfactant, and a catholyte solution.

In some embodiments of the invention, the catholyte solution is a stabilized or upgraded catholyte solution.

The invention extends to the use of lignin, in particular technical lignin, in the cleaning of a surface fouled by a hydrocarbon-containing material.

Other aspects and features of the present disclosure will become apparent, to those ordinarily skilled in the art, upon review of the following description of specific embodiments of the disclosure.

BRIEF DESCRIPTION OF THE DRAWINGS

The invention will now be described in more detail, by way of example only, with reference to the accompanying drawing in which.

DESCRIPTION OF PREFERRED EMBODIMENTS

Figure 1:
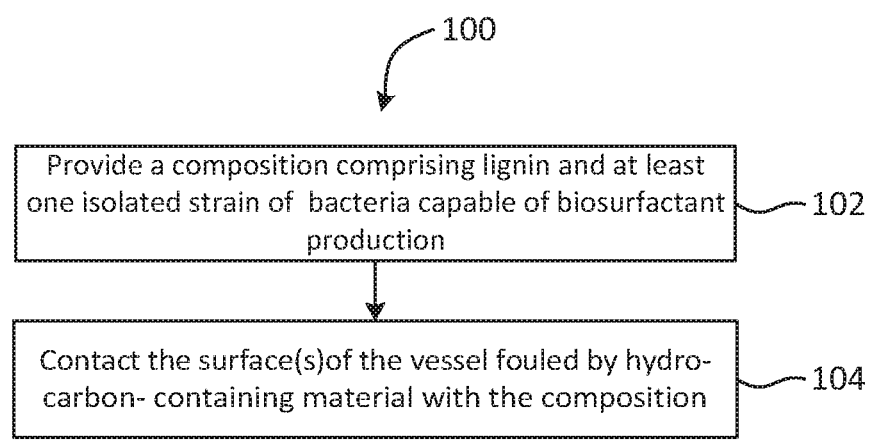
FIG. 1 is a flowchart of an example method for cleaning a vessel fouled with a hydrocarbon-containing material, according to some embodiments.

Generally, the present disclosure provides a composition for hydrocarbon cleaning applications, in particular methods for cleaning vessels, such as storage tanks, tankers, trucks, bilge pumps or the like, pipes, such as oil pipes, or decks or platforms, such as on tankers or oil rigs, for example, fouled by hydrocarbon containing materials.

In some embodiments, the hydrocarbon-containing material may have been recovered from a subterranean reservoir. As used herein, "reservoir" refers to any subterranean region, in an earth formation, that includes at least one pool or deposit of hydrocarbons therein.

As used herein, "lignin" refers to a biopolymer that is found in the secondary cell wall of plants and some algae. Lignin is a complex cross-linked phenolic polymer with high heterogeneity. Typical sources for the lignin include, but are not limited to, softwood, hardwood, and herbaceous plants such as corn stover, bagasse, grass, and straw, for example.

In some embodiments, the lignin comprises technical lignin. As used herein, "technical lignin" refers to lignin that has been isolated from lignocellulosic biomass, for example, as a byproduct of a pulp and paper production or a lignocellulosic biorefinery. Technical lignins may have a modified structure compared to native lignin and may contain impurities depending on the extraction process. In some embodiments, the technical lignin comprises at least one of Kraft lignin, lignosulfonates, soda lignin, organosolv lignin, steam-explosion lignin, and enzymatic hydrolysis lignin. In other embodiments, the technical lignin may comprise any other form of technical lignin.

In embodiments where the lignin comprises lignosulfonates, the lignosulfonates may be in the form of a salt including, for example, sodium lignosulfonate, calcium lignosulfonate, or ammonium lignosulfonate.

In other embodiments, the technical lignin is in the form of unhydrolyzed Kraft black liquor. Black liquor is a byproduct of the Kraft process and may contain not only lignin but hemicellulose, inorganic chemicals used in the pulping process, and other impurities. In other embodiments, the technical lignin is in the form of "brown liquor" (also referred to as red liquor, thick liquor or sulfite liquor), which refers to the spent liquor of the sulfite process. In other embodiments, the technical lignin may be in the form of any other spent cooking liquor of a pulping process or any other suitable lignin-based byproduct.

In other embodiments, the lignin may be synthetic lignin or any other suitable type of lignin.

In some embodiments, the lignin is hydrolyzed. As used herein, "hydrolyze" refers to using acid or base hydrolysis to at least partially separate lignin from the polysaccharide content of the lignocellulosic biomass. For example, where the lignin is in the form of black liquor, carbon dioxide may be used to precipitate Kraft lignin from the black liquor and then the Kraft lignin may be neutralized with sodium hydroxide.

In some embodiments, the lignin is in aqueous suspension. As used herein, an "aqueous suspension" of lignin refers to solid particles of lignin suspended, dispersed, and/or dissolved in a solvent that at least partially comprises water. In some embodiments, the solvent comprises substantially all water. In other embodiments, the solvent may comprise a combination of water and any other suitable solvent.

In some embodiments, the aqueous suspension of lignin may have a solids content of about 10% to about 90%, or about 25% to about 75%, or about 30% to about 60%, or about 33% to about 55%. In some embodiments, the aqueous suspension of lignin may have a solids content of about 50% to about 60%. In some embodiments, the aqueous suspension of lignin may have a solids content of about 10% or above, or of about 25% or above, or of about 30% or above, or of about 33% or above or of about 50% or above. In some embodiments, the aqueous suspension of lignin may have a solids content of about 90% or below, or of about 75% or below, or of about 60% or below, or of about 55% or below. In some embodiments, the aqueous suspension has a solids content of about 46%. A solids content of about 33% to about 55% may allow the composition to be flowable, which may be preferred for some applications. In other applications, the composition may be used as a slurry and the solids content may be as high as about 85% to about 90%.

In some embodiments, the lignin comprises at least one of lignin nanoparticles and lignin microparticles. As used herein, "nanoparticle" refers to a particle in the nanometer size range, for example, between about 1 nm and about 100 nm, and "microparticle" refers to a particle in the micrometer size range, for example, between about 100 nm and about 1000 µm (1 mm). In some preferred embodiments, the lignin particles have a size of about 200 nm or less, or about 100 nm or less. In some preferred embodiments, at least about 20%, or at least 30%, or at least 40%, or at least 50%, or at least 60%, or at least 70%, or at least 80%, or at least 90% of the lignin particles are nanoparticles having a size of about 100 nm or less.

The lignin nanoparticles and/or microparticles can be produced by any suitable method. For example, the lignin nanoparticles and/or microparticles can be produced using at least one of: solvent shifting; pH shifting; cross-linking polymerization; mechanical treatment; ice-segregation; template based synthesis; aerosol processing; electro spinning; and carbon dioxide ($CO_2$) antisolvent treatment. Such methods are described in Beisl et al. "Lignin from Micro- to Nanosize: Production Methods" *Int. J. Mol. Sci.* 2017; 18:1244, incorporated herein by reference in its entirety.

In some preferred embodiments, lignin nanoparticles are produced using a pH shifting method, for example, as disclosed in Beisl et al. Briefly, the starting lignin material may be dissolved in a basic solution (e.g. an aqueous NaOH solution at pH 12) and the pH of the solution may be gradually decreased by addition of acid (e.g. $HNO_3$) to precipitate lignin nanoparticles. The solution may then be neutralized (e.g. by addition of NaOH) to resuspend the nanoparticles. The resulting particles may have a size of about 200 nm or less, or about 100 nm or less. In other embodiments, the lignin nanoparticles may be produced by any other suitable method.

By providing the lignin in the form of lignin nanoparticles and/or microparticles, the surface area of the lignin is increased, thereby also increasing the negative force around each particle. In addition, lignin nanoparticles and/or microparticles may have improved solubility in water. Conventional lignins are typically only soluble in water at alkaline pH; however, nanoparticles and/or microparticles may be soluble in approximately neutral water (Beisl et al.), which may be preferred for some applications.

In some embodiments, where the lignin comprises an aqueous suspension of lignin nanoparticles, the zeta potential value of the suspension may be about −5 to about −80 mV. In some embodiments, the specific gravity of the aqueous suspension of lignin nanoparticles is between about 1.286 to about 1.7 SG.

The composition of the invention further comprises at least one isolated strain of bacteria capable of biosurfactant production and/or at least one biosurfactant produced from at least one isolated strain of bacteria capable of producing a biosurfactant.

As used herein, "isolated" or "isolate", when used in reference to a strain of bacteria, refers to bacteria that have been separated from their natural environment. In some embodiments, the isolated strain or isolate is a biologically pure culture of a specific strain of bacteria. As used herein, "biologically pure" refers to a culture that is substantially free of other organisms.

As used herein, "biosurfactant" refers to compounds that are produced at the bacterial cell surface and/or secreted from the bacterial cell and function to reduce surface tension and/or interfacial tension. Non-limiting examples of biosurfactants include lipopeptides, surfactin, glycolipids, rhamnolipids, methyl rhamnolipids, and viscosin, for example. The isolated strain may be capable of producing one or more types of biosurfactant.

In some embodiments, the isolated strain may produce one or more additional active compounds. For example, the isolated strain may produce a biopolymer, solvent, acid, exopolysaccharide, and the like.

In some embodiments, the at least one isolated strain of bacteria comprises a strain of *Bacillus*. In other embodiments, the at least one isolated strain comprises a strain of bacteria capable of biosurfactant production and that is non-pathogenic. Non-limiting examples of suitable strains are listed in Satpute et al. "Methods for investigating biosurfactants and bioemulsifers: a review" Critical Reviews in Biotechnology, 2010, 1-18. For example, the at least one isolated strain of *Bacillus* may be *Bacillus amyloliquefaciens, Bacillus licheniformis, Bacillus pumilus, Bacillus subtilis*, or combinations thereof, and in particular *Bacillus licheniformis*.

In some embodiments the pH of the composition may be selected or adjusted to provide a suitable pH for the isolated strain(s). In some embodiments, the composition may further comprise one or more nutrients to support growth of the bacteria such as, for example, acetate, one or more vitamins, or the like.

In some embodiments, the isolated strain is in a viable form. For example, in some embodiments, the isolated strain may be in the form of a liquid suspension. In some embodiments, the isolated strain may be incubated for a suitable period of time prior to incorporation into the composition such that at least a portion of biosurfactant(s) are secreted into the bacterial suspension and therefore can be incorporated into the composition. For example, the bacteria can be incubated/fermented for between about one day and about six months or longer. The isolated strain may be incubated in the presence of a nutrient source and under suitable conditions (e.g. temperature, agitation, etc.) to produce the biosurfactant(s).

In other embodiments, the isolated strain may be in a lyophilized (freeze-dried) form. In some embodiments, the freeze-dried form comprises freeze-dried spores.

In some embodiments, where the isolated strain is in the form of a liquid suspension or in a freeze-dried form, the composition may comprise approximately 40 billion CFU (colony forming units) may be combined with at least about 1 g of lignin and up to several tons of lignin.

In other embodiments, the isolated strain may in an inviable form. For example, the isolated strain may be in the form of heat-killed cells or a cell lysate. In these embodiments, the bacteria of the isolated strain may be incubated for a suitable period of time prior to loss of viability (e.g. heat killing or lysis) such that a sufficient quantity of biosurfactant(s) is secreted into the bacterial suspension for incorporation into the composition. For example, the bacteria may be incubated for at least one week prior to loss of viability.

In other embodiments, a liquid suspension of bacteria may be incubated to produce the biosurfactant(s) and a supernatant containing the biosurfactant(s) may be separated from the bacterial cells and used in the composition.

Without being limited by theory, it is believed that the combination of lignin and the biosurfactant produced by the isolated strain act to mimic the natural habitat of the biosurfactant producing strains. The lignin may function as a growth substrate that contains required nutrients (carbon and fructose) to support growth of the bacteria, with the exception of additional acetate and metallic vitamins which may be added to the composition as needed.

In addition, a series of drop collapse tests were conducted to evaluate additional benefits of combining the lignin with a suitable biosurfactant in the composition of the invention. In particular, the tests were carried out to determine the effectiveness of the compositions of the invention in reducing the surface tension of water and other liquids. The results indicated that a further advantage in combining the lignin and biosurfactant in the composition of the invention is a significant reduction in surface tension at concentrations of between about 10 ppm and 300 ppm of the biosurfactant, which assists significantly in the compositions ability to cut through hydrocarbon containing materials.

The lignin-based cleaning compositions of the invention further comprise catholyte solutions. As used herein, "catholyte solution" is an activated solution produced in an electrochemical reaction, and is that part of the electrolyte solution adjacent the cathode of an electrochemical cell. It can be produced, for instance, from a 0.05%-1% salt brine (NaCl or KCl), and has a pH in the range 10.0 to 13.0 and an ORP/Redox value of less than about −800 mV, typically in the order of −900 to −950 mV. In the case of an NaCl starting solution, the active ingredient is highly active, and typically unstable, NaOH.

The cleaning compositions of the invention can comprise from about 1% to about 75% by volume of the catholyte solution.

In some embodiments, the composition further comprises at least one of a carboxylic acid or a salt or ester thereof. In some embodiments, the carboxylic acid is a di-carboxylic acid or a salt or ester thereof. The carboxylic acid or salt/ester thereof may function as a solvent, for example, by facilitating formation of a stable emulsion of the various components of the composition. In some embodiments, the composition comprises a carboxylic acid ester. In some embodiments, the carboxylic acid ester comprises a methyl ester or a butyl ester. In some embodiments, the butyl esters are produced by biochemical metathesis. In some embodiments, the butyl ester comprises n-Butyl 4-oxopentanoate. In some embodiments, the methyl ester comprises unsaturated $C_{10}$ or $C_{12}$ methyl ester. In some embodiments, the methyl ester comprises methyl 9-decenoate or methyl 9-dodecenoate. In some embodiments, the methyl ester is produced from a plant oil feedstock.

In some embodiments, the composition may comprise about 1% to about 30%, or about 1% to about 20%, or about 1% to 10% of di-carboxylic acid and/or butyl esters by volume.

In some embodiments, the composition further comprises carbon black. The carbon black may be electroconductive carbon black and the carbon black may function to increase the conductivity of the composition. In some embodiments, the carbon black may be conductive, superconductive, extraconductive or ultraconductive carbon black. In some embodiments, the carbon black may be in the form of carbon black beads, microparticles, and/or nanoparticles. For example, the carbon black may comprise Printex™ XE2 B Beads from Orion Engineered Carbons™. In some embodiments, the composition may comprise about 0.5% to about 10% carbon black by volume. In some embodiments, addition of carbon black may increase the negative zeta potential of the composition thereby increasing its electrical stability. In other embodiments, the composition may comprise any other highly conductive microparticle and/or nanoparticle.

In some embodiments, the composition is gasified with a gas. As used herein, "gasified" refers to introduction of a gas into the composition such that bubbles of the gas are suspended therein. The term "aerated" refers to gasifying with air or oxygen. The gas may be selected based on the aerobic or anaerobic nature of the isolated strain(s) incorporated into the composition. In some embodiments, the gas at least partially comprises oxygen. For example, the gas may be air or relatively pure oxygen. In some embodiments, the gas may at least partially comprise carbon dioxide and/or nitrogen. Gasification may function to provide oxygen and/or other suitable gasses directly or in close proximity to the bacterial cells of the isolated strain. Gasification may promote proliferation of the bacterial cells and allow the composition to be used or stored for an extended period of time. In some embodiments, the aerated composition may have a half-life of about 20 to 30 days.

In some embodiments, the composition is gasified with nanobubbles and/or microbubbles of the gas. As used herein, "nanobubble" refers to bubbles in the nanometer range and "microbubble" refers to bubbles in the micrometer range. The nanobubbles and/or microbubbles may be introduced into the composition by any suitable means including, for example, a micro- or nanobubble nozzle or a venturi tube.

It has surprisingly been found that using a stabilized or upgraded as opposed to an otherwise unstable catholyte solution enhances the cleaning action of the compositions of the invention. Accordingly, in some embodiments, the catholyte solution is pre-treated in a system that is designed to introduce nitrogen gas into the catholyte solution, in particular in the form of nano- and/or micro-bubbles for incorporation into a composition of the invention.

Accordingly, in some embodiments, the catholyte solution is upgraded prior to blending with the other components of the cleaning composition.

In some embodiments, the composition may comprise any other suitable components. For example, in some embodiments, the composition may further comprise at least one nutrient source for the live bacteria of the isolated strain.

Therefore, in some embodiments, a relatively non-toxic, inert, and sustainable composition is provided for hydrocarbon cleaning applications. The composition may also be relatively low cost as lignin is a waste product of pulp and paper operations that is typically discarded.

For convenience, the invention is described in more detail in what follows in respect of cleaning the surface(s) of a vessel fouled by a hydrocarbon-containing material. However, it is to be understood that the compositions of the invention can be used to clean any appropriate surface(s) fouled by hydrocarbon containing materials.

FIG. 1 is a flowchart of an example method 100 for cleaning a vessel fouled with a hydrocarbon-containing material, according to some embodiments.

At block 102, a composition is provided comprising lignin, at least one isolated strain of bacteria capable of biosurfactant production, and a catholyte solution. The composition may be any embodiment of the composition described above. The term "provided" in this context may refer to making, receiving, buying, or otherwise obtaining the composition.

At block 104, the surface(s) of the vessel contaminated by the hydrocarbon-containing material is/are contacted with the composition. The term "contact" in this context may refer to any means by which the composition may be brought into contact with the vessel's surface(s). In some embodiments, the composition may be introduced into the vessel contaminated with hydrocarbon-containing material, and recovered from the vessel after a suitable period of time. In some embodiments, the composition may be flowed through the vessel to contact the vessel surface(s) fouled by the hydrocarbon-containing material.

In some embodiments, the composition may briefly be contacted with the material. For example, a fluid composition may be flowed through the vessel at a relatively high rate. In other embodiments, the material may be contacted with the composition for a desired residency time. For example, the residency time may be at least an hour, a day, or a week. Longer residency times may allow the bacteria in the composition to proliferate and secrete biosurfactants, allowing for greater biosurfactant production and greater contact between the biosurfactants and the hydrocarbon-containing material.

In some embodiments, the material may be contacted with the composition at relatively low temperatures such as below 100° C., below 50° C., below 25° C., or lower. In some embodiments, the temperature may be the ambient temperature i.e. the temperature in the surrounding environment without the addition of heat. In other embodiments, the temperature may be raised, for example, to lower the viscosity of the hydrocarbon-containing material. The temperature can be raised by electric heating, electromagnetic heating, microwave heating or any other suitable heating means.

In some embodiments, the ratio of the composition to the hydrocarbon-containing material is about 50:1. In some embodiments, the composition comprises between about 1 wt. % and about 50 wt. % of the combined composition and hydrocarbon-containing material mixture. As one example, about 98 wt. % hydrocarbon-containing material may be contacted with about 2 wt. % of the composition. In other embodiments, any other suitable ratio may be used.

In some embodiments, the hydrocarbon-containing material may be analyzed prior to contacting the material with the composition. For example, the material may be analyzed to determine the hydrocarbon content, water content, solids content, pH, electrical conductivity, and the like. Analysis of the material may be used to determine a suitable dosage of the composition and/or if further processing of the material is desirable. For example, the dosage protocol may be defined by 1 FT (interfacial tension), shear angle, and kinetic separate laboratory tests.

Various modifications besides those already described are possible without departing from the concepts disclosed herein. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Although particular embodiments have been shown and described, it will be appreciated by those skilled in the art that various changes and modifications might be made without departing from the scope of the disclosure. The terms and expressions used in the preceding specification have been used herein as terms of description and not of limitation, and there is no intention in the use of such terms and expressions of excluding equivalents of the features shown and described or portions thereof.

The invention claimed is:

1. A method for cleaning a surface or surfaces fouled by a hydrocarbon containing material, the method comprising:
   providing a composition comprising lignin, at least one isolated strain of bacteria capable of producing at least one biosurfactant, and/or at least one biosurfactant produced from at least one bacteria capable of producing a biosurfactant, and a catholyte solution;
   contacting the surface(s) with the hydrocarbon-containing material with the composition to remove or reduce the hydrocarbon fouling; and, optionally
   recovering the hydrocarbon-containing material from the composition.

2. A method according to claim 1, wherein the method comprises cleaning the surface(s) of a vessel, pipe, or a deck or platform.

3. A method according to claim 1, wherein the method comprises cleaning the surface(s) of a storage tank, tanker, truck, bilge pump, oil pipe, tanker deck or oil rig platform.

4. A method according to claim 1, wherein the surface(s) is/are contacted with the composition for a time sufficient to clean the surface(s), and the composition and hydrocarbon containing mixture are recovered for further processing.

5. A method according to claim 1, wherein the surfaces(s) to be cleaned are of a vessel or pipe, the method comprising flowing the composition through the vessel or pipe to clean the surface(s) thereof, and recovering the composition and hydrocarbon containing mixture from the vessel or pipe for further processing.

6. A method according to claim 1, wherein the hydrocarbon-containing material comprises a hydrocarbon-containing liquid.

7. A method according to claim 1, wherein the lignin comprises at least one of lignin nanoparticles and lignin microparticles.

8. A method according to claim 1, wherein the lignin includes lignin particles, at least 20% of the lignin particles being lignin nanoparticles.

9. A hydrocarbon cleaning composition suitable for cleaning a surface or surfaces to remove or reduce fouling by hydrocarbon-containing materials according to the method of claim 1, the composition comprising:

lignin, at least one isolated strain of bacteria capable of producing at least one biosurfactant, and/or at least one biosurfactant produced from at least one isolated strain of bacteria capable of producing a biosurfactant, and a catholyte solution.

10. The composition of claim 9, wherein the lignin is technical lignin, comprising at least one of Kraft lignin, lignosulfonates, soda lignin, organosolv lignins, steam-explosion lignin, enzymatic hydrolysis lignin, or unhydrolyzed Kraft black liquor lignin.

11. The composition of claim 9, wherein the lignin is in an aqueous suspension.

12. The composition of claim 9, wherein the lignin comprises at least one of lignin nanoparticles and lignin microparticles.

13. The composition of claim 9, wherein the lignin includes lignin particles, at least 20% of the lignin particles being lignin nanoparticles.

14. The composition of claim 9, wherein the at least one isolated strain comprises at least one isolated strain of *Bacillus* selected from the group consisting of *Bacillus amyloliquefaciens, Bacillus licheniformis, Bacillus pumilus, Bacillus subtilis*, and combinations thereof.

15. The composition of claim 9, wherein the at least one isolated strain is in the form of a liquid suspension or freeze-dried spores.

16. The composition of claim 9, wherein the catholyte solution is a stabilized or upgraded catholyte solution.

17. The composition of claim 9, further comprising at least one of a carboxylic acid or a salt or ester thereof.

18. The composition of claim 17, wherein the carboxylic acid ester comprises a methyl ester or a butyl ester or the carboxylic acid or salt or ester thereof comprises a di-carboxylic acid or a salt or ester thereof.

19. The composition of claim 9, further comprising carbon black.

20. The composition of claim 9, wherein the composition is gasified with at least one of nanobubbles and microbubbles.

* * * * *